(12) United States Patent
Suzuki

(10) Patent No.: US 9,481,091 B2
(45) Date of Patent: Nov. 1, 2016

(54) ROBOT SYSTEM FOR TAKING OUT BULK STACKED WORKPIECES AND JUDGMENT METHOD FOR JUDGING WORKPIECE GRIPPING STATE

(71) Applicant: FANUC CORPORATION, Minamitsuru-gun, Yamanashi (JP)

(72) Inventor: Tadanori Suzuki, Yamanashi (JP)

(73) Assignee: Fanuc Corporation, Minamitsuru-gun, Yamanashi (JP)

( * ) Notice: Subject to any disclaimer, the term of this patent is extended or adjusted under 35 U.S.C. 154(b) by 0 days.

(21) Appl. No.: 14/644,829

(22) Filed: Mar. 11, 2015

(65) Prior Publication Data

US 2015/0258689 A1    Sep. 17, 2015

(30) Foreign Application Priority Data

Mar. 12, 2014  (JP) ................................ 2014-049146

(51) Int. Cl.
| | |
|---|---|
| B25J 15/00 | (2006.01) |
| B25J 9/16 | (2006.01) |
| B25J 13/08 | (2006.01) |
| G01G 9/00 | (2006.01) |

(52) U.S. Cl.
CPC ............ *B25J 9/1697* (2013.01); *B25J 13/087* (2013.01); *Y10S 901/47* (2013.01)

(58) Field of Classification Search
CPC .... B23P 19/007; B25J 13/085; B25J 13/087; B25J 13/088; B25J 15/0019; B25J 15/0023; B25J 15/0052; B25J 15/06; B25J 15/0608; B25J 15/0616; B25J 17/0208; B25J 9/144; B25J 9/1612; B25J 9/1633; B25J 9/1694; B65B 35/06; B65G 47/1485; G01G 9/00; G01L 5/009; G05B 2219/37357; G05B 2219/39161; G05B 19/39574; G05B 2219/40014; G05B 2219/40035; G05B 2219/40053; G05B 2219/40537; H05K 13/0408; Y10S 901/47
See application file for complete search history.

(56) References Cited

U.S. PATENT DOCUMENTS

| | | | |
|---|---|---|---|
| 2011/0211938 A1* | 9/2011 | Eakins ................... | B25J 9/1687 414/738 |
| 2011/0223000 A1* | 9/2011 | Martinez ................ | B25J 9/1687 414/730 |

(Continued)

FOREIGN PATENT DOCUMENTS

| | | |
|---|---|---|
| CN | 101195221 | 6/2008 |
| JP | 04-152223 A | 5/1992 |

(Continued)

OTHER PUBLICATIONS

Krivts et al. "Structure of Pneumatic Actuating Systems." Pneumatic Actuating Systems for Automatic Equipment Structure and Design. CRC, 2006. 1-19. Web.*

(Continued)

*Primary Examiner* — Dale Moyer
(74) *Attorney, Agent, or Firm* — RatnerPrestia

(57) ABSTRACT

A robot system for successively taking out bulk stacked workpieces of the same type, wherein a hand of a robot comprises: a base part attached to an arm, a cylinder device with a cylinder and a piston rod, and a gripping part attached to a front end part of the piston rod. The robot system further comprises a fluid pressure adjusting device which adjust a fluid pressure inside of the cylinder, a movement detecting device which detects a retracting movement of the piston rod, and a judgment device which judge if the hand is gripping a designated number of workpieces, based on a magnitude of fluid pressure inside the cylinder and detection results of the movement detecting device.

4 Claims, 7 Drawing Sheets

(56) References Cited

U.S. PATENT DOCUMENTS

| | | | | |
|---|---|---|---|---|
| 2013/0061695 | A1* | 3/2013 | Sato | B25J 13/085 73/865 |
| 2013/0151007 | A1* | 6/2013 | Valpola | B25J 9/1694 700/245 |
| 2014/0052295 | A1* | 2/2014 | Eakins | B25J 9/1687 700/258 |
| 2014/0230581 | A1* | 8/2014 | Nakatani | B25J 13/085 73/865 |

FOREIGN PATENT DOCUMENTS

| | | |
|---|---|---|
| JP | 06-344351 A | 12/1994 |
| JP | 08-094424 A | 4/1996 |
| JP | 09018129 | 1/1997 |
| JP | 2001047385 | 2/2001 |
| JP | 2001068840 | 3/2001 |
| JP | 2002127071 | 5/2002 |
| JP | 2002210685 | 7/2002 |
| JP | 200934744 | 2/2009 |
| JP | 2013-027940 A | 2/2013 |
| JP | 2013-056402 A | 3/2013 |
| JP | 2013-195199 A | 9/2013 |

OTHER PUBLICATIONS

Krivts et al. "Pneumatic Actuators." Pneumatic Actuating Systems for Automatic Equipment Structure and Design. CRC, 2006. 21-69. Web.*

* cited by examiner

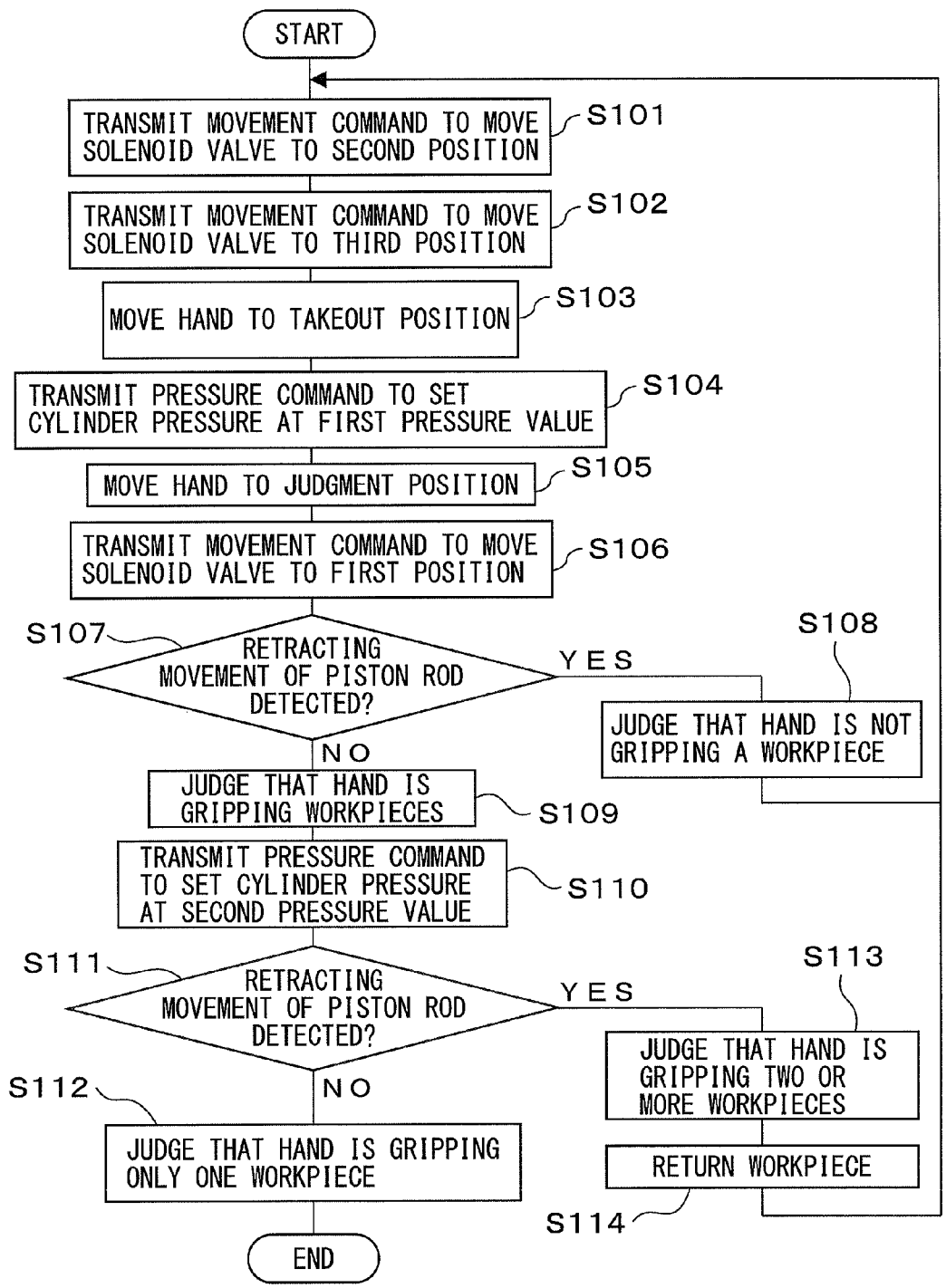

ROBOT SYSTEM FOR TAKING OUT BULK STACKED WORKPIECES AND JUDGMENT METHOD FOR JUDGING WORKPIECE GRIPPING STATE

BACKGROUND OF THE INVENTION

1. Field of the Invention

The present invention relates to a robot system for successively taking out bulk stacked workpieces of the same type by means of a robot comprising an arm and a hand, and a judgment method for judging a workpiece gripping state by a hand.

2. Description of the Related Art

When conveying a workpiece with a robot comprising an arm and a hand, various photoelectric sensors attached to the hand may be used as means for confirming a gripping state of a workpiece by a hand. In this case, it is preferable to accurately position the hand with respect to the workpiece to prevent a gripped workpiece by a hand from leaving the detection range of a photoelectric sensor. In this respect, in order to successively take out and convey workpieces which are bulk stacked or piled up in a container, it is necessary to pick up and grip workpieces which are laid in arbitrary postures. For this reason, it is not always easy to accurately position a hand with respect to a workpiece. One of the possible ways to confirm the gripping state of bulk stacked workpieces is setting a photoelectric sensor independent from the robot at the outside of the container and then moving the hand move in the detection range of that photoelectric sensor. However, when the confirmation result by the photoelectric sensor indicates that the hand is not gripping a workpiece, it is necessary to move the hand inside the container again so as to take out a workpiece, and therefore the cycle time for the take-up process ends up becoming longer. Note that, one example of a hand for gripping bulk stacked workpieces is an absorption-type hand which comprises a cylinder device attached to an arm, and an absorption attached to a front end part of a piston rod of the cylinder device. Such an absorption-type hand is disclosed in JP-A-H6-344351.

Incidentally, there is also a robot in the prior art which uses a device other than the above-mentioned photoelectric sensor as means for confirming the workpiece gripping state by a hand. For example, JP-A-2013-195199 and JP-A-2013-56402 propose a robot which measure a weight of a workpiece using a force sensor which is arranged between an arm and a hand, and JP-A-2013-27940 proposes a robot comprising a weight measuring device which is attached to a front end part of an arm. Further, JP-A-H8-94424 proposes a weight measuring device comprising a load sensor which is attached to a hand so as to measure a load acting on a mounting plate of a vacuum pad, and JP-A-H4-152223 proposes a handling device which measures the weight of a workpiece using an electromagnetic force type measuring device with a coil and magnet. However, in order to employ the arts which are described in JP-A-2013-195199, JP-A-2013-56402, JP-A-2013-27940, JP-A-H8-94424, and JP-A-H4-152223, it is necessary to incorporate a dedicated measuring device into an arm or hand, and therefore the robot tends to have a complicated structure and thus involve an increased manufacturing cost.

A robot system and judgment method for judging a workpiece gripping state by a hand, using a simple and inexpensive mechanism, have been sought.

SUMMARY OF INVENTION

According to a first aspect of the present invention, there is provided a robot system for successively taking out bulk stacked workpieces of the same type, using a robot comprising: an arm and a hand, wherein the hand comprises a base part which is attached to the arm, a cylinder device which has a cylinder which extends from the base part and a piston rod which projects out from a front end part in an extension direction of the cylinder and can move in an opposite direction to the projecting direction due to fluid pressure inside the cylinder, and a gripping part which is attached to a front end part of the piston rod in the projecting direction and which can grip a workpiece, and the robot system further comprises a fluid pressure adjusting device which can adjust a fluid pressure inside of the cylinder, a movement detecting device which detects movement of the piston rod in an opposite direction to the projecting direction, and a judgment device which judges if the hand is gripping a designated number of workpieces based on a magnitude of fluid pressure inside the cylinder and detection results of the movement detecting device as the basis to.

According to a second aspect of the present invention, there is provided a judgment method for judging a gripping state of workpieces by the hand in the robot system in the first aspect, comprising: adjusting a fluid pressure inside the cylinder by the fluid pressure adjusting device to a first pressure value where the piston rod moves in an opposite direction to the projecting direction when the gripping part does not grip a workpiece and where the piston rod does not move when the gripping part grips a workpiece, detecting if the piston rod has moved in an opposite direction to the projecting direction by the movement detecting device, and judging the hand is not gripping a workpiece when fluid pressure of the first pressure value causes the piston rod to move in an opposite direction to the projecting direction while judging that the hand is gripping a workpiece when fluid pressure of the first pressure value does not cause the piston rod to move.

According to a third aspect of the present invention, there is provided the judgment method in the second aspect, further comprising: adjusting a fluid pressure in the cylinder by the fluid pressure adjusting device to a second pressure value where the piston rod moves in an opposite direction to the projecting direction when the gripping part grips only one workpiece and where the piston rod does not move when the gripping part holds two or more workpieces, if it is judged that the hand is gripping a workpiece, detecting again whether the piston rod has moved in an opposite direction to the projecting direction by the movement detecting device, and judging that the hand is gripping only one workpiece when fluid pressure of the second pressure value causes the piston rod to move in the opposite direction from the projecting direction while judging that the hand is gripping two or more workpieces when fluid pressure of the second pressure value does not cause the piston rod to move.

According to a fourth aspect of the invention, there is provided the judgment method in the second or third aspect, further comprising: adjusting a fluid pressure inside the cylinder by the fluid pressure adjusting device so that the piston rod cancels out gravity which acts on the gripping part without moving in the opposite direction from the projecting direction until the gripping part grips the workpiece.

These and other objects, features, and advantages of the present invention will become clearer with reference to the detailed description of illustrative embodiments of the present invention which are shown in the attached drawings.

BRIEF DESCRIPTION OF THE DRAWINGS

FIG. 11 is a flow chart which shows a procedure of illustrative processing for judging a gripping state of the present embodiment.

DETAILED DESCRIPTION OF EMBODIMENTS

Below, embodiments of the present invention will be explained in detail with reference to the drawings. Note that the following explanation does not limit the technical scope of the inventions which are described in the claims or the meaning of terms etc.

Figure 1:
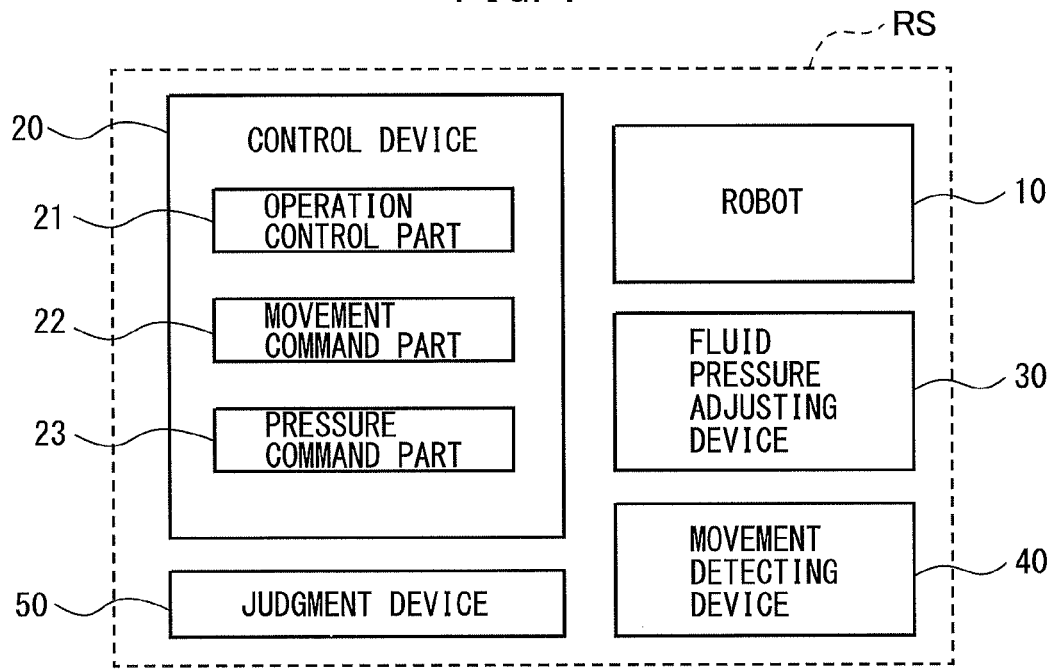
FIG. 1 is a block diagram which shows the configuration of an illustrative robot system of one embodiment of the present invention.

Referring to FIG. 1 to FIG. 11, a robot system of one embodiment of the present invention will be explained. The robot system of the present embodiment is a conveyor system which successively takes out and conveys bulk stacked workpieces of the same type. FIG. 1 is a block diagram which shows the configuration of illustrative robot system RS of the present embodiment. As shown in FIG. 1, the robot system RS of the present example includes a robot 10 comprising an arm and a hand, a control device 20, a fluid pressure adjusting device 30, a movement detecting device 40, and a judgment device 50. Further, the robot system RS of the present example has the function of judging a workpiece gripping state by a hand of the robot 10 while taking out bulk stacked workpieces. Such judgment processing may be called "gripping state judgment processing" below. The devices of the robot system RS of the present example will be explained in detail below.

Figure 2:
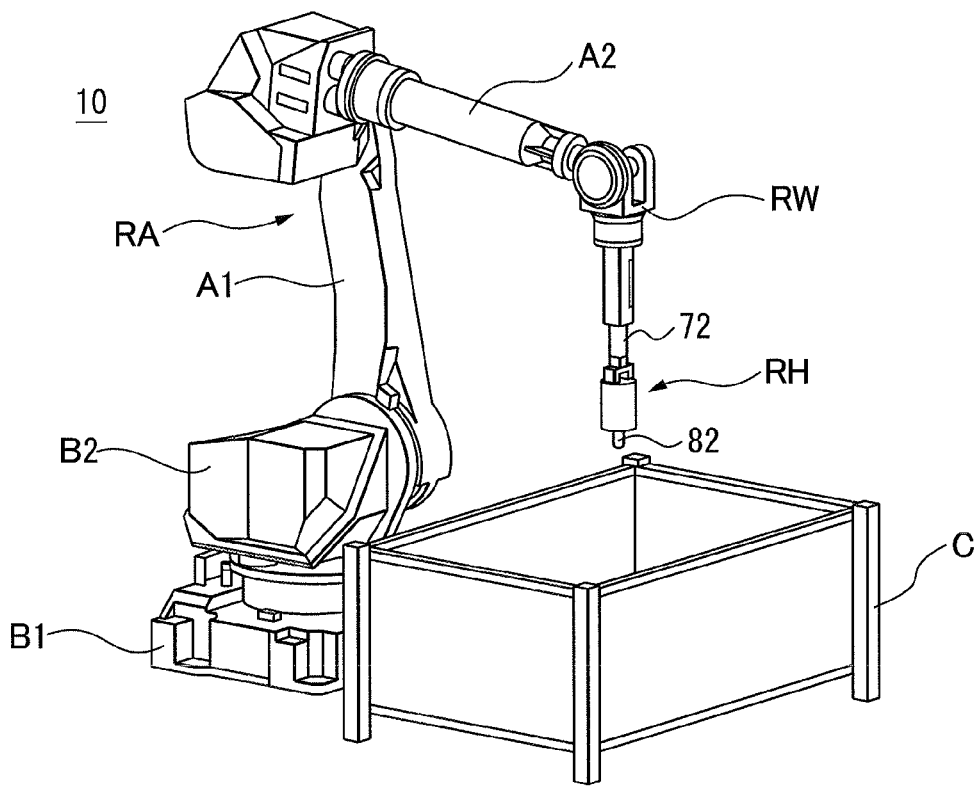
FIG. 2 is a perspective view which shows the appearance of a robot in the robot system of FIG. 1.

FIG. 2 is a perspective view which shows the appearance of the robot 10 in the robot system RS of FIG. 1. As shown in FIG. 2, the robot 10 of the present example is a vertical articulated robot comprising an arm RA which has a wrist part RW, and a hand RH which is attached to the wrist part RW. Here, the arm RA of the robot 10 of the present example has a fixed base part B1 which is fixed to a floor surface, a swivel base part B2 which is connected to the fixed base part B1, a lower arm part A1 which is connected to the swivel base part B2, an upper arm part A2 which is connected to the lower arm part A1, and a wrist part RW which is connected to the upper arm part A2. Further, the arm RA of the present example can freely change the position and posture of the hand RH which is attached to the wrist part RW by means of the drive force of servo motors (not shown). As shown in FIG. 2, the robot 10 of the present example is operable to successively take out workpieces which are stored in a lid-less bulk storage container C. To this end, the arm RA moves the attraction member 82 of the hand RH to a takeout position right above the workpiece to be taken out so that the attraction member 82 of the hand RH comes in contact with the workpiece. This takeout position can be detected by, for example, a visual sensor (not shown) which is set in the container C.

Figure 3:
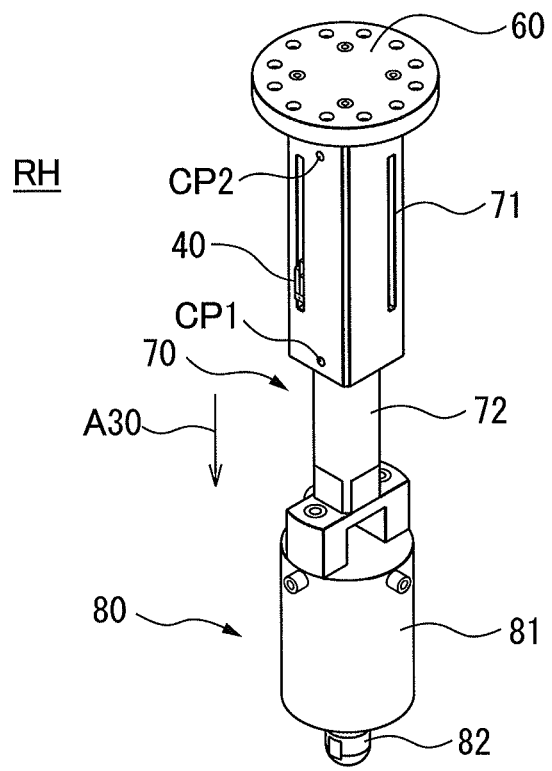
FIG. 3 is a partial enlarged view which shows the hand and its vicinity in a robot of FIG. 2.

FIG. 3 is a partial enlarged view which shows only the hand RH in the robot 10 of FIG. 2. As shown in FIG. 3, the hand RH of the present example comprises a disk-shaped base part 60 which is attached to the wrist part RW of the arm RA, and a cylinder device 70 which is connected to the base part 60 and is driven by air pressure or oil pressure or other fluid pressure. The cylinder device 70 of the present example functions as a floating mechanism which absorbs the impact when the moving hand RH unintentionally interferes with the workpiece. As shown in FIG. 3, the cylinder device 70 of the present example has a square tube-shaped cylinder 71 which extends from the base part 60, a piston (not shown) which can move back and forth inside the cylinder 71, and a piston rod 72 which is connected to the piston and projects from the front end part of the extension direction of the cylinder 71. Below, the projecting direction of the piston rod 72 which is expressed by the arrow mark A30 of FIG. 3 may be called simply the "rod projecting direction".

As shown in FIG. 3, the cylinder 71 of the present example has connecting ports CP1 and CP2 which are respectively formed at the two end parts in the rod projecting direction. Through these connecting ports CP1 and CP2, the working fluid of the cylinder device 70 is supplied and exhausted. Below, the connecting port CP1 which adjoins the piston rod 72 may be referred to as the "rod side connecting port CP1", while the connecting port CP2 which adjoins the base part 60 will be referred to as the "base part side connecting port CP2". Further, the piston rod 72 of the present example can move in the opposite direction to the rod projecting direction due to the pressure of the working fluid which is supplied through the rod side connecting port CP1. More specifically, if high pressure fluid is supplied to the inside of the cylinder 71 through the rod side connecting port CP1, a pushing force in the opposite direction to the rod projecting direction will act on the piston. Due to this, the piston rod 72 moves together with the piston in the opposite direction to the rod projecting direction. In the following explanation, movement of the piston rod 72 in the opposite direction to the rod projecting direction may be referred to as "retracting movement".

Next, referring to FIG. 3, the hand RH of the present example further comprises a gripping part 80 which is attached to the front end part of the piston rod 72 in the projecting direction and which can grip a workpiece. The gripping part 80 of the present example has a columnar electromagnet 81 which generates an attraction force by magnetic force and a projection-shaped attraction member 82 which uses attraction force of the electromagnet 81 to pick up and grip a metal workpiece. As shown in FIG. 3, the electromagnet 81 of the present example is connected to the front end part of the piston rod 72, while the attraction member 82 of the present example projects out from the front end part of the electromagnet 81 in the rod projecting direction. The gripping part 80 of the present example is integrally connected with the piston rod 72, and therefore configured to make a retracting movement together with the piston rod 72 due to the fluid pressure inside the cylinder 71. Note that, when the robot 10 takes out a bulk stacked workpiece, the hand RH of the present example is kept in a posture where the rod projecting direction faces downward in the vertical direction (see FIG. 2). Such a posture may be called the "take-up posture" below. At the takeout posture of FIG. 2, the piston rod 72 is parallel with the vertical direction, but the piston rod 72 may also be slanted somewhat from the vertical direction.

Referring again to FIG. 1, the movement detecting device 40 in the robot system RS of the present example has the function of detecting retracting movement of the piston rod 72 of the above-mentioned cylinder device 70. The movement detecting device 40 of the present example is a general lead switch and may be assembled into the cylinder 71 of the cylinder device 70 (see FIG. 3). Further, the fluid pressure adjusting device 30 in the robot system RS of the present example has the function of adjusting the fluid pressure inside the cylinder 71 of the above-mentioned cylinder device 70. More specifically, the fluid pressure adjusting device 30 can adjust the fluid pressure inside of the cylinder 71 to, for example, a pressure value where the piston rod 72 will makes a retracting movement by the fluid pressure when the hand RH in the above-mentioned takeout posture is not gripping a workpiece and where the piston rod 72 will remain in the initial position instead of making a retracting movement when the hand RH in the takeout posture is gripping one or more workpieces. Such a pressure value may be referred to below as the "first pressure value". The first pressure value can be determined in advance in accordance with the type of the workpiece.

Figure 4:
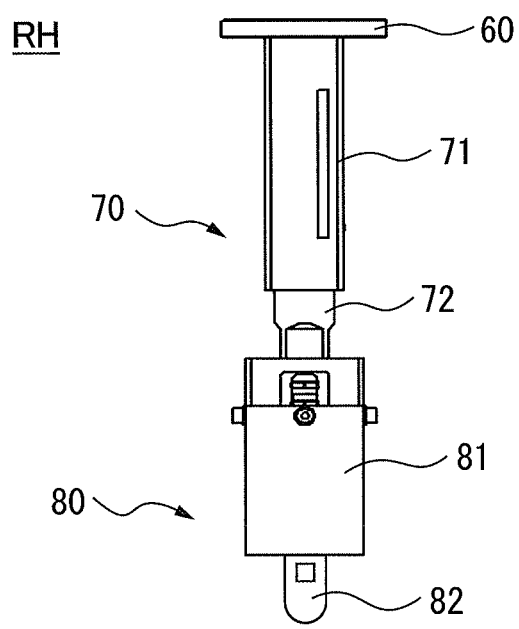
FIG. 4 is a first side view of a hand kept at a takeout posture which shows the state where a fluid pressure inside a cylinder is equal to a first pressure value.
Figure 5:
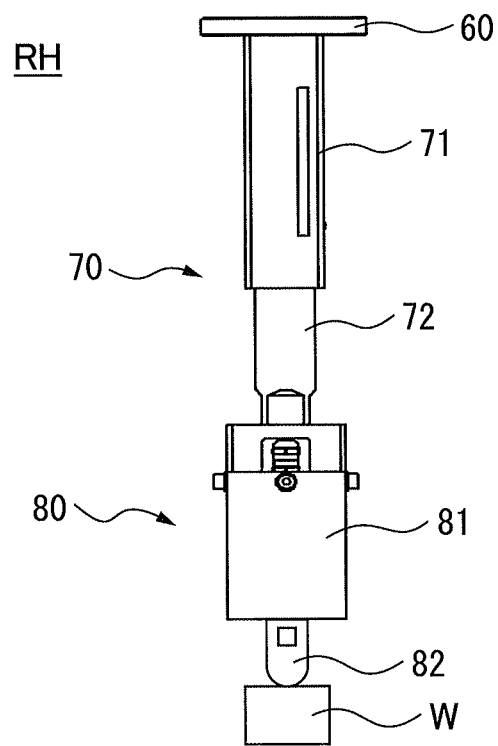
FIG. 5 is a second side view of a hand kept at a takeout posture which shows the state where a fluid pressure inside a cylinder is equal to a first pressure value.

FIG. 4 and FIG. 5 are side views which show a hand RH at a takeout posture and show the state where the fluid pressure inside the cylinder 71 is equal to the above first pressure value. As shown in FIG. 4, when the hand RH in the takeout posture is not gripping a workpiece W, that is, when the gripping part 80 failed to pick up a workpiece W, the piston rod 72 makes a retracting movement upwardly in the vertical direction by the fluid pressure of the cylinder 71. On the other hand, as shown in FIG. 5, when the hand RH in the takeout posture is gripping one or more workpieces W, that is, when the gripping part 80 succeeded in picking up a workpiece W, the downward force in the vertical direction which acts from the gripping part 80 to the piston rod 72 becomes relatively large, and therefore the piston rod 72 remains in the initial position without making a retracting movement due to the fluid pressure.

Figure 6:
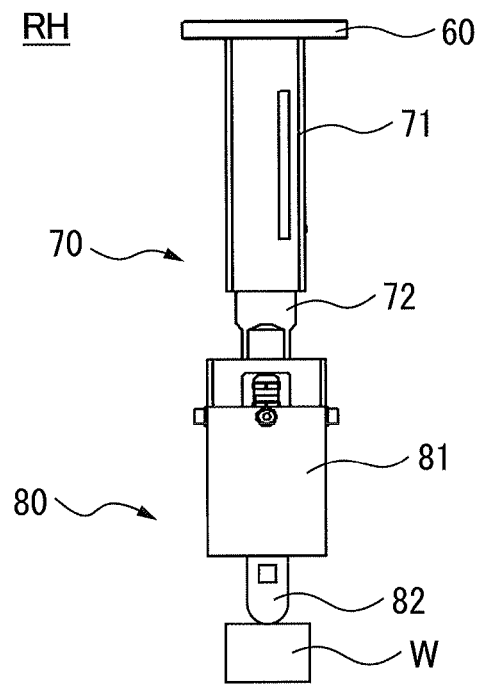
FIG. 6 is a first side view of a hand kept at a takeout posture which shows the state where a fluid pressure inside a cylinder is equal to a second pressure value.
Figure 7:
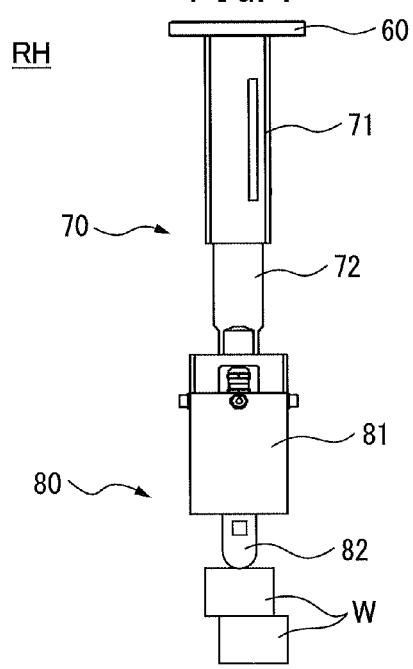
FIG. 7 is a second side view of a hand kept at a takeout posture which shows the state where a fluid pressure inside a cylinder is equal to a second pressure value.

Similarly, the fluid pressure adjusting device 30 of the present example can also adjust the fluid pressure inside of the cylinder 71 to another pressure value larger than the first pressure value where the piston rod 72 makes a retracting movement by the fluid pressure when the hand RH in the takeout posture is gripping only one workpiece and where the piston rod 72 remains in the initial position instead of making a retracting movement when the hand RH in the takeout posture is gripping two or more workpieces. Such another pressure value may be referred to below as the "second pressure value". The second pressure value, like the first pressure value, can be determined in advance in accordance with the type of the workpiece. FIG. 6 and FIG. 7 are side views which show a hand RH in the takeout posture and show the state where the fluid pressure inside of the cylinder 71 is equal to the above second pressure value. As shown in FIG. 6, when the hand RH in the takeout posture is gripping one workpiece W, the piston rod 72 makes a retracting movement upwardly in the vertical direction due to the fluid pressure of the cylinder 71. On the other hand, as shown in FIG. 7, when the hand RH in the takeout posture is gripping two or more workpieces W, the downward force in the vertical direction which acts from the gripping part 80 on the piston rod 72 becomes relatively large, and therefore the piston rod 72 remains in the initial position without making a retracting movement due to the fluid pressure.

Figure 8:
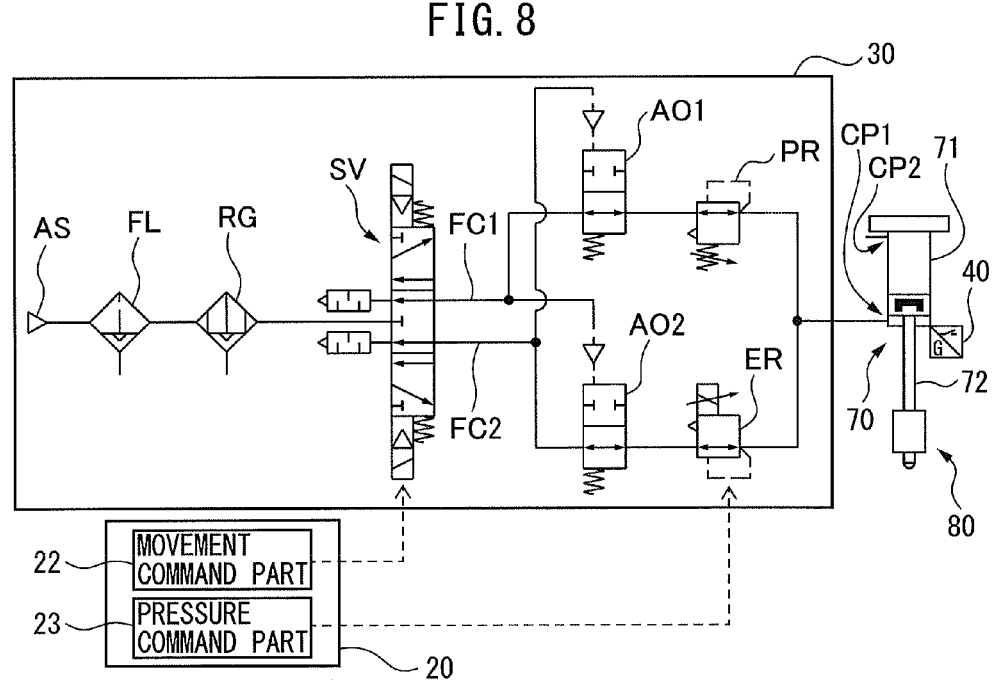
FIG. 8 is an air pressure circuit diagram of a fluid pressure adjusting device in a robot system of FIG. 1 and shows the state where a solenoid valve is located at a second position.

Next, the operation principle of the fluid pressure adjusting device 30 of the present example will be explained. In the following explanation, the cylinder device 70 of the robot system RS is driven by the air pressure, and the fluid pressure adjusting device 30 adjusts the air pressure inside the cylinder 71. FIG. 8 is an air pressure circuit diagram of the fluid pressure adjusting device 30 in the robot system RS of FIG. 1. As shown in FIG. 8, the fluid pressure adjusting device 30 of the present example has a solenoid valve SV which is connected to an air pressure source AS through the intermediary of a filter FL and regulator RG. The solenoid valve SV of the present example is a three-position electromagnetic valve which can move among a predetermined first position, second position, and third position. In FIG. 8, the solenoid valve SV is located at a neutral position which is constituted by the second position. The "neutral position" referred to here is the position of the solenoid valve SV which is assumed when there is no input of a control signal.

As shown in FIG. 8, the flow channel lying downstream of the solenoid valve SV in the fluid pressure adjusting device 30 of the present example branches into a first flow channel FC1 which passes through a first air operation valve AO1 and precision regulator PR to reach a rod side connecting port CP1 of the cylinder 71, and a second flow channel FC2 which passes through a second air operation valve AO2 and electro-pneumatic regulator ER to reach a rod side connecting port CP1. As will be understood from FIG. 8, when the solenoid valve SV is located at the second position, the compressed air from the air pressure source AS is cut off at the solenoid valve SV, and both the first flow channel FC1 and the second flow channel FC2 are connected to atmospheric pressure at the solenoid valve SV. In this case, both the first air operation valve AO1 and the second air operation valve AO2 are opened, and therefore the air pressure inside the cylinder 71 becomes equal to atmospheric pressure. Therefore, when the solenoid valve SV is located at the second position, the piston rod 72 of the cylinder device 70 will never make a retracting movement due to the air pressure.

Figure 9:
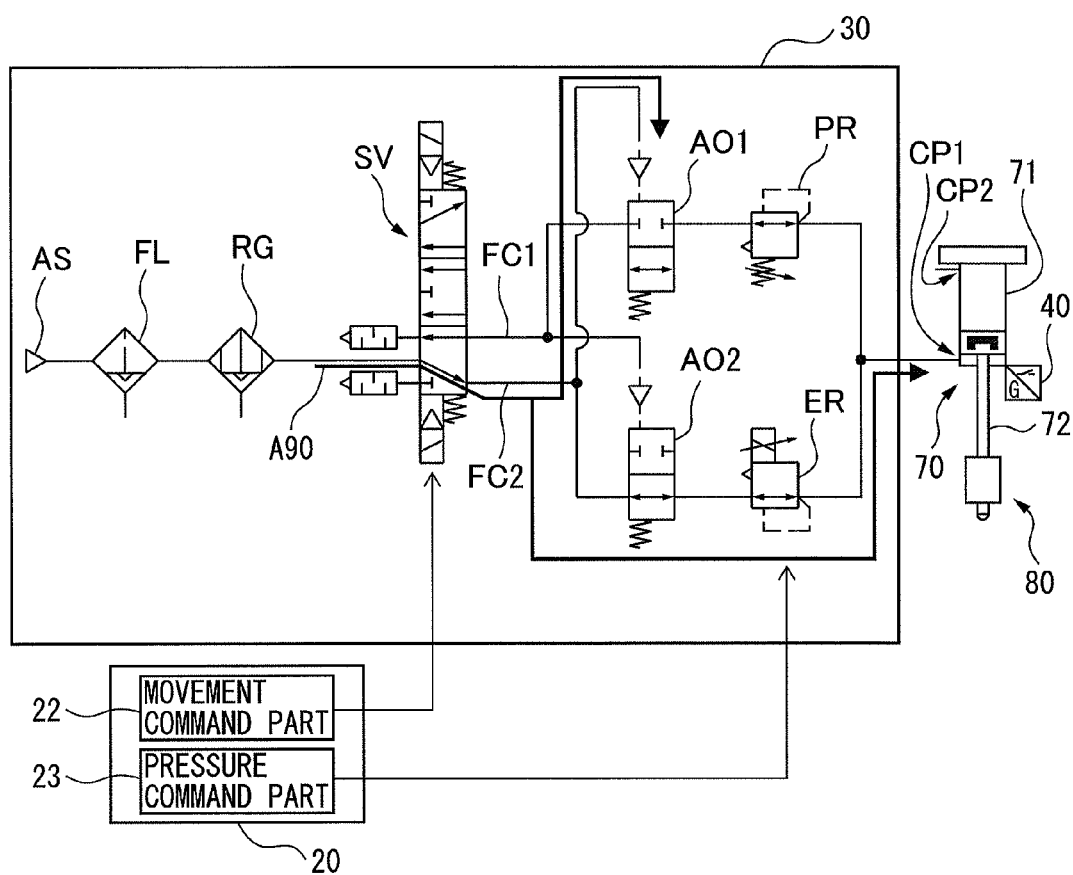
FIG. 9 is an air pressure circuit diagram similar to FIG. 8 and shows the state where a solenoid valve has been moved to a first position.

As shown in FIG. 8, the solenoid valve SV of the present example is configured to move to the first position or third position in accordance with a control signal of the movement command part 22 of the control device 20. Such a control signal may be referred to below as a "movement command". FIG. 9 is an air pressure circuit diagram similar to FIG. 8 and shows the state where the solenoid valve SV has moved to the first position. The flow of the compressed air in this case is represented by the arrow mark A90. As will be understood from the arrow mark A90, when the solenoid valve SV is located at the first position, the compressed air from the air pressure source AS passes through the solenoid valve SV to be supplied to the second flow channel FC2, and the first flow channel FC1 is connected at the solenoid valve SV to the atmospheric pressure. In this case, the second air operation valve AO2 is opened and the first air operation valve AO1 is closed, and therefore, the compressed air from the air pressure source AS passes through the electro-pneumatic regulator ER of the second flow channel FC2 to be supplied to the rod side connecting port CP1. Therefore, when the solenoid valve SV is located at the first position, the air pressure inside the cylinder 71 can be freely adjusted by the electro-pneumatic regulator ER, and the piston rod 72 can thus make a retracting movement due to the air pressure. As shown in FIG. 9, the electro-pneumatic regulator ER adjust the air pressure inside the cylinder 71 based on a control signal from the pressure command part 23 of the control device 20. Such a control signal may be called a "pressure command" below. The electro-pneumatic regulator ER can adjust the air pressure inside the cylinder 71 to the above first pressure value or second pressure value, for example.

Figure 10:
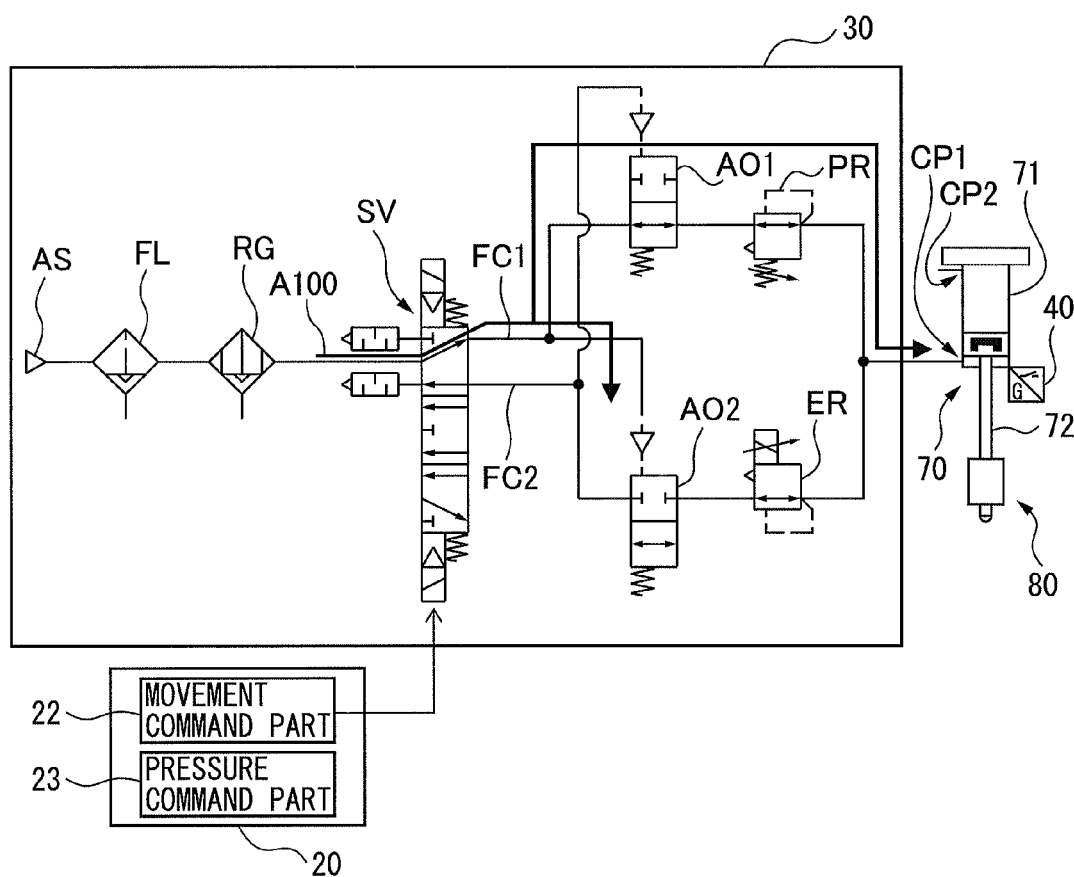
FIG. 10 is an air pressure circuit diagram similar to FIG. 8 and shows the state where a solenoid valve has been moved to a third position.

Next, FIG. 10 is an air pressure circuit diagram similar to FIG. 8 and shows the state where the solenoid valve SV has moved to the third position. The flow of compressed air in this case is represented by the arrow mark A100. As will be understood from the arrow mark A100, when the solenoid valve SV is located at the third position, compressed air from the air pressure source AS passes through the solenoid valve SV to be supplied to the first flow channel FC1 while the second flow channel FC2 is connected at the solenoid valve SV to the atmospheric pressure. In this case, the first air operation valve AO1 is opened and the second air operation valve AO2 is closed, and therefore the compressed air from the air pressure source AS passes through the precision regulator PR of the first flow channel FC1 to be supplied to the rod side connecting port CP1. Further, since the precision regulator PR is capable of highly precise adjustment of the output pressure, it can adjust the air pressure inside the cylinder 71 so as not to cause a retracting movement of the piston rod 72 due to the pushing force acting thereon. In this way, part of the gravity acting on the gripping part 80 is cancelled out by the above pushing force, and therefore it is possible to ease the impact when the gripping part 80 contacts the workpiece. As a result, even if the weight of the gripping part 80 is large, it is possible to prevent damage to the workpiece W due to the contact impact between the gripping part 80 and the workpiece W.

Referring again to FIG. 1, the control device 20 in the robot system RS of the present example has an operation control part 21, movement command part 22, and pressure command part 23. Here, the operation control part 21 of the present example generates operation commands for the different parts of the robot 10 according to a previously prepared operating program. The thus generated operation commands are transmitted to the servo motors for driving various components of the robot 10. Further, the movement command part 22 of the present example generates a movement command for the solenoid valve SV of the fluid pressure adjusting device 30 in the above-mentioned gripping state judgment processing (see FIG. 9 and FIG. 10). Further, the pressure command part 23 of the present example generates a pressure command of the electro-pneumatic regulator ER of the fluid pressure adjusting device 30 in the above-mentioned gripping state judgment processing (see FIG. 9).

Referring again to FIG. 1, the judgment device 50 in the robot system RS of the present example has the function of judging how a workpiece is gripped by the hand RH during the above-mentioned gripping state judgment processing. More specifically, the judgment device 50 of the present example judges if the hand RH is gripping a designated number of workpieces based on the fluid pressure of the cylinder 71 of the hand RH and the detection results by the movement detecting device 40. In particular, the judgment device 50 of the present example judges that the hand RH is not gripping a workpiece W when the piston rod 72 makes a retreating movement with the fluid pressure inside the cylinder 71 being equal to the above first pressure value (see FIG. 4), and judges in turn that the hand RH is gripping one or more workpieces W when the piston rod 72 does not make a retracting movement with the fluid pressure inside the cylinder 71 being equal to the above first pressure value (see FIG. 5). Furthermore, the judgment device 50 of the present example judges that the hand RH is gripping only one workpiece W when the piston rod 72 makes a retracting movement with the fluid pressure inside the cylinder 71 being equal to the second pressure value (see FIG. 6), and judges in turn that the hand RH is gripping two or more workpieces W when the piston rod 72 does not make retracting movement with the fluid pressure of the cylinder 71 being equal to the second pressure value (see FIG. 7). Note that, in FIG. 1, the judgment device 50 and the control device 20 are shown as separate devices, but the judgment device 50 may also be part of the control device 20.

Next, the specific procedure of the gripping state judgment processing in the robot system RS of the present embodiment will be explained. FIG. 11 is a flowchart which shows the procedure of an illustrative gripping state judgment processing. As shown in FIG. 11, first, at step S101, the movement command part 22 of the control device 20 transmits a movement command to move the solenoid valve SV of the fluid pressure adjusting device 30 to the above second position. This ensures that both the first air operation valve AO1 and the second air operation valve AO2 of the fluid pressure adjusting device 30 are opened, and therefore the residual pressure inside the cylinder 71 of the cylinder device 70 is removed (see FIG. 8). Next, at step S102, the movement command part 22 of the control device 20 transmits a movement command to move the solenoid valve SV of the fluid pressure adjusting device 30 to the above third position. This ensures that the air pressure inside the cylinder 71 is adjusted by the precision regulator PR, and therefore a pushing force is applied to the piston rod 72 so as not cause a retracting movement of the piston rod 72 (see FIG. 10).

Next, at step S103, the arm RA moves the hand RH to the above takeout position. During this step, part of the gravity acting on the gripping part 80 of the hand RH is cancelled out by the above pushing force, and therefore the contact impact between the gripping part 80 and the workpiece is eased. Note that, until the hand RH reaches the takeout position and grips the workpiece W, the above-mentioned base part side connecting port CP2 of the cylinder 71 is preferably kept connected to the atmospheric pressure. This ensures that the magnitude of the reaction force acting from the floating mechanism i.e. the cylinder device 70 to the workpiece W is kept constant regardless of the floating amount of the floating mechanism. Therefore, even if the moving hand RH unintentionally interferes with the workpiece W, it is possible to prevent the hand RH from applying a large reaction force to the workpiece W. In contrast, according to a conventional floating mechanism which uses springs or other elastic members, the magnitude of the reaction force which is applied to the workpiece increases proportionally to its floating amount, and therefore the workpiece may be seriously damaged due to unintentional interference between the hand and the workpiece.

Next, at step S104, the pressure command part 23 of the control device 20 transmits a pressure command to set the air pressure inside the cylinder 71 at the above first pressure value. Next, at step S105, the arm RA moves the hand RH to a predetermined judgment position. The judgment position referred to here is, for example, a position separated from the above takeout position upward in the vertical direction by a predetermined distance. Next, at step S106, the movement command part 22 of the control device 20 transmits a movement command to move the solenoid valve SV of the fluid pressure adjusting device 30 to the above first position. This ensures that the first air operation valve AO1 of the fluid pressure adjusting device 30 is closed and the second air operation valve AO2 is opened, and therefore the air pressure inside the cylinder 71 is adjusted to the first pressure value by the electro-pneumatic regulator ER (see FIG. 9).

Next, at step S107, the movement detecting device 40 detects if the piston rod 72 has made a retracting movement. Here, when the piston rod 72 has made a retracting movement (step S107, YES), the judgment device 50 judges that the hand RH is not gripping a workpiece W (step S108). The state of the hand RH in this case is illustrated in FIG. 4. After that, the robot system RS returns to the above step S101. On the other hand, when the piston rod 72 has not made a retracting movement (step S107, NO), the judgment device 50 judges that the hand RH is gripping one or more workpieces W (step S109). The state of the hand RH in this case is illustrated in FIG. 5. Next, at step S110, the pressure command part 23 of the control device 20 transmits a pressure command to set the air pressure inside the cylinder 71 at the above second pressure value. As a result, the electro-pneumatic regulator ER adjusts the air pressure inside the cylinder 71 to the second pressure value (see FIG. 9).

Next, at step S111, the movement detecting device 40 again detects if the piston rod 72 has made a retracting movement. Here, when the piston rod 72 has not made a retracting movement (step S111, NO), the judgment device 50 judges that the hand RH is gripping only one workpiece W (step S112). The state of the hand RH in this case is illustrated in FIG. 6. After that, the robot system RS finishes the gripping state judgment processing. On the other hand, when the piston rod 72 has not made a retracting movement (step S111, YES), the judgment device 50 judges that the hand RH is gripping two or more workpieces W (step S113). The state of the hand RH in this case is illustrated in FIG. 7. Next, at step S114, the arm RA moves the hand RH to a predetermined return position in the container C, and the hand RH then releases the absorption state of the electromagnet 81 to return the workpiece W. The return position referred to here, for example, is a position separated from the above takeout position upward in the vertical direction by a predetermined distance. After that, the robot system RS returns to the above step S101.

As shown above, according to the robot system RS of the present example, it is possible to judge the gripping state of workpieces W by the hand RH, based on the magnitude of the fluid pressure of the cylinder 71 of the cylinder device 70 and the detection results of a retracting movement of the piston rod 72. More specifically, it is possible to judge if the hand RH is gripping a workpiece W by adjusting the fluid pressure inside the cylinder 71 to the predetermined first pressure value and then detecting if the piston rod 72 makes a retracting movement with the fluid pressure inside being equal to the first pressure value (see FIG. 11, step S107). Therefore, according to the robot system RS of the present example, it is possible to judge if the hand RH is gripping one or more workpieces W by a simple and inexpensive mechanism. Furthermore, according to the robot system RS of the present example, it is possible to judge if the hand RH is gripping one or more workpieces W without moving the hand RH to the outside of the container C, and therefore it is possible to shorten the cycle time for taking out a bulk stacked workpiece W.

Further, according to the robot system RS of the present example, it is possible to judge if the hand is gripping only one workpiece by adjusting the fluid pressure inside the cylinder 71 to a predetermined second pressure value and then detecting if the piston rod 72 makes a retracting movement with the fluid pressure being equal to the second pressure value (see FIG. 11, step S111). Therefore, according to the robot system RS of the present example, it is possible to judge if the hand RH is gripping only one workpiece W by a simple and inexpensive mechanism. Furthermore, according to the robot system RS of the present example, it is possible to judge if the hand RH is gripping only one workpiece W without moving the hand RH to the outside of the container C, and therefore it is possible to shorten the cycle time for taking out bulk stacked workpieces one at a time.

EFFECT OF INVENTION

According to the first and second aspects of the present invention, it is possible to judge the workpiece gripping state by the hand, based on the magnitude of the fluid pressure inside the cylinder and the detection result of a retracting movement of the piston rod. More specifically, it is possible to judge if the hand is gripping a workpiece by setting the fluid pressure inside the cylinder at a predetermined first pressure value and then detecting if the piston rod make a retracting movement due to the fluid pressure being equal to the first pressure value. Therefore, according to the first and second aspects of the present invention, it is possible to judge if the hand is gripping a workpiece by a simple and inexpensive mechanism. Furthermore, according to the first and second aspects of the present invention, it is possible to judge if the hand is gripping a workpiece without moving the hand to the outside of the container, and therefore it is possible to shorten the cycle time for taking out bulk stacked workpieces.

According to the first and third aspects of the present invention, it is possible to judge a workpiece gripping state by the hand, based on the magnitude of the fluid pressure inside of the cylinder and the detection results of a retracting movement of the piston rod. More specifically, it is possible to judge if the hand is gripping only one workpiece by adjusting the fluid pressure inside the cylinder at a predetermined second pressure value and then detecting if the piston rod makes a retracting movement due to the fluid pressure being equal to the second pressure value. Therefore, according to the first and third aspects of the present invention, it is possible to judge if a hand is gripping only one workpiece by a simple and inexpensive mechanism. Furthermore, according to the first and third aspects of the present invention, it is possible to judge if a hand is gripping only one workpiece without moving the hand to the outside of the container, and therefore it is possible to shorten the cycle time for taking out one bulk stacked workpiece at a time.

According to a fourth aspect of the present invention, a pushing force is applied to the piston rod so as to cancel out the gravity which acts on the gripping part until the gripping part grips the workpiece, and therefore it is possible to ease the contact impact between the gripping part and the workpiece. Therefore, according to a fourth aspect of the present invention, it is possible to prevent damage to the workpiece due to the contact impact between the gripping part and the workpiece even if the gripping part has a heavy weight.

The present invention is not limited to the above embodiments and can be modified in various ways within the scope of the claims. For example, while the above embodiments illustrate an electromagnetic absorption type hand RH which uses the absorption force of an electromagnet 81 to grip a workpiece W, the robot system of the present invention may also employ a vacuum suction type or servo drive type hand, for example. Further, the dimensions, shapes, materials, etc. of the parts of the above-mentioned robot system RS are just examples. Various dimensions, shapes, materials, etc. may be employed for achieving the effect of the present invention needless to say.

The invention claimed is:

1. A robot system for successively taking out bulk stacked workpieces of the same type, using a robot comprising an arm and a hand, wherein
    said hand comprises:
    a base part which is attached to said arm,
    a cylinder device which has a cylinder which extends downward in the vertical direction from said base part and a piston rod which projects out from a front end part in an extension direction of said cylinder and is configured to move in an opposite direction to the projecting direction due to fluid pressure inside said cylinder, and
    a gripping part which is attached to a front end part of said piston rod in the projecting direction and which is configured to grip a workpiece, and
    said robot system further comprises:
    a fluid pressure adjusting device which is configured to adjust a fluid pressure inside of said cylinder,
    a movement detecting device which detects movement of said piston rod in an opposite direction to said projecting direction, and
    a judgment device which judges when said hand is gripping a designated number of workpieces based on a magnitude of fluid pressure inside said cylinder and detection results of said movement detecting device,
    said fluid pressure adjusting device is configured to adjust the fluid pressure inside said cylinder such that said gripping part receives a force in the opposite direction from said projecting direction to be movable with said piston rod in the opposite direction from said projecting direction until said gripping part grips the workpiece.

2. A judgment method for judging a gripping state of workpieces by a hand of a robot system including a base part attached to an arm, the hand including a cylinder device having a cylinder which extends downward in the vertical direction from said base part, a piston rod which projects out from a front end part in an extension direction of said cylinder, and a gripping part attached to a front end part of said piston rod in the projecting direction, the judgment method comprising:
    adjusting, by a fluid pressure adjusting device, a fluid pressure inside said cylinder such that said gripping part receives a force in the opposite direction from said projecting direction to be movable with said piston rod in the opposite direction from said projecting direction until said gripping part grips the workpiece,
    adjusting, by the fluid pressure adjusting device, the fluid pressure inside said cylinder to a first pressure value where said piston rod moves in an opposite direction to said projecting direction when said gripping part does not grip a workpiece and where said piston rod does not move when said gripping part grips a workpiece,
    detecting, by a movement detecting device, when said piston rod has moved in an opposite direction to said projecting direction,
    judging, by a judging device, when said hand is gripping a designated number of workpieces based on a magnitude of fluid pressure inside said cylinder and detection results of said movement detecting device, and
    judging, by the judging device, that said hand is not gripping a workpiece when fluid pressure of said first pressure value causes said piston rod to move in an opposite direction to said projecting direction while judging that said hand is gripping a workpiece when fluid pressure of said first pressure value does not cause said piston rod to move.

3. The judgment method according to claim 2 further comprising:
    adjusting a fluid pressure in said cylinder by said fluid pressure adjusting device to a second pressure value where said piston rod moves in an opposite direction to said projecting direction when said gripping part grips only one workpiece and where said piston rod does not move when said gripping part grips two or more workpieces, when it is judged that said hand is gripping a workpiece,
    detecting again whether said piston rod has moved in an opposite direction to said projecting direction by said movement detecting device, and
    judging that said hand is gripping only one workpiece when fluid pressure of said second pressure value causes said piston rod to move in the opposite direction from said projecting direction while judging that said hand is gripping two or more workpieces when fluid pressure of said second pressure value does not cause said piston rod to move.

4. The judgment method according to claim 2, further comprising:
    adjusting the fluid pressure inside said cylinder by said fluid pressure adjusting device so that a pushing force is applied to the piston rod to cancel out gravity which acts on said gripping part without causing a movement of the piston rod in the opposite direction from said projecting direction until said gripping part grips the workpiece.

* * * * *